United States Patent [19]
O'Neal

[11] 4,385,856
[45] May 31, 1983

[54] APPARATUS FOR TRANSPORTING PLANAR MATERIALS

[76] Inventor: John L. O'Neal, 24982 Thompson Rd., Perrysburg, Ohio 43551

[21] Appl. No.: 257,817

[22] Filed: Apr. 27, 1981

[51] Int. Cl.³ .................. B60P 7/10; B61D 3/16; B61D 45/00

[52] U.S. Cl. .................... 410/34; 105/377; 410/39; 410/40; 410/41

[58] Field of Search .......... 105/377; 98/118; 296/3; 410/32, 34, 38, 39, 41, 40

[56] References Cited

U.S. PATENT DOCUMENTS

| | | | |
|---|---|---|---|
| 848,917 | 4/1907 | McElligott | 98/118 |
| 2,940,402 | 6/1960 | Hansen et al. | 410/40 |
| 3,848,917 | 11/1974 | O'Neal | 296/3 |
| 3,878,942 | 4/1975 | Hansen et al. | 410/39 X |
| 4,013,018 | 3/1977 | Hansen et al. | 105/377 X |
| 4,037,870 | 7/1977 | O'Neal | 410/38 |
| 4,195,738 | 4/1980 | O'Neal | 296/3 X |

Primary Examiner—Bruce H. Stoner, Jr.
Assistant Examiner—Howard Beltran
Attorney, Agent, or Firm—Wilson, Fraser, Barker & Clemens

[57] ABSTRACT

A trailer apparatus for transporting planar sheets of material in a substantially vertical position. The trailer includes a plurality of A-frame members symmetrically disposed in parallel spaced-apart relationship along the longitudinal vertical midplane of the trailer. Outwardly extending support beams are secured to the lower termini of the A-frames and adjustable cargo straps which laterally restrain the material extend between the apex of each A-frame member and the respective support beam. A pair of laterally spaced-apart longitudinal rails extend generally the length of the trailer and are secured to the A-frame members. Pairs of transversely extending beams are slidably mounted on the rails and may be moved to engage the edges of the material to longitudinally restrain it.

11 Claims, 6 Drawing Figures

APPARATUS FOR TRANSPORTING PLANAR MATERIALS

BACKGROUND OF THE INVENTION

The invention relates generally to improvements in apparatus for transporting large sheets of rigid material and, more particularly, to such apparatus intended for transporting large sheets or panes of glass.

Modern architecture emphasizes the extensive use of glass. Large expanses of glass are used not only for its beauty but to provide natural lighting for enclosed areas such as atriums, lobbys and hallways. Typically, such designs require large uninterrupted or minimally interrupted areas of glass, often as large as twelve by twenty feet or larger. The use of glass as substantially the sole facing material on buildings has also become common. This emphasis coupled with an equal, if not greater emphasis upon energy conservation, has also resulted in the use of large glass panels of double wall construction having an insulating layer of air or a vacuum disposed therebetween. Such double thickness insulated glass panels are not only approximately twice as heavy as their single sheet counterparts, but substantially more fragile.

Due to the complex technology required to manufacture such large glass sheets or panels, particularly those having an evacuated region, they are manfactured in a limited number of locations and must be transported, frequently over long distances, to building sites. Because of their size, weight and fragility, the transportation of such material is especially difficult.

I have developed several devices for transporting such glass sheets. My U.S. Pat. No. 3,848,917 teaches a trailer design wherein pivoted extensible arms and longitudinal beams restrain glass sheets against lateral movement.

Another improvement in the art of transporting such glass sheets is shown in my issued U.S. Pat. No. 4,037,870 which discloses a second trailer having a rigid A-frame and a plurality of clamping devices for restraining the glass sheets against both transverse and longitudinal movement.

My issued U.S. Pat. No. 4,195,738 discloses a further improvement in the glass sheet or panel transporting art. Again, the device includes a truck trailer having plural centrally disposed rigid A-frame members. Lateral and longitudinal restraints are also incorporated into the trailer design as is a special interconnecting member which provides adjustment of the vertical position of the restraining members to accommodate various sizes of glass sheets.

The aforementioned glass transporting apparatus provide an exceptionally safe and secure environment for the transportation of glass. Nonetheless, the complexity often is counterproductive from the standpoint of rapid and simplified placement and removal of the glass from the trailer.

SUMMARY OF THE INVENTION

The instant invention is directed to an apparatus for transporting planar materials such as glass panes, panels and lights and includes a substantially conventional truck trailer frame having a plurality of rigid A-frame members disposed in parallel spaced apart relationship along the central longitudinal axis of the trailer. At the bottom of each leg of each A-frame member is an outwardly directed support beam which is oriented at a right angle to the leg of the A-frame. The glass sheets are cradled in these two members and are thus tipped inwardly toward the center of the trailer at a slight angle from the vertical. Longitudinal rails which extend substantially the length of the trailer are secured within the A-frame members at locations slightly below their vertical midpoints. Secured for sliding translation to these rails are a plurality of transversely extending restraining beams which may be adjusted and secured longitudinally by means of associated straps or cables and ratchet winches to engage the edges of the glass sheets and thereby restrain them longitudinally. Lateral restraint of the glass sheets is achieved by a plurality of adjustable cargo straps which extend from the upper ends of the A-frame members to the respective ends of the outwardly directed support beams.

While being transported in the apparatus according to the instant invention, the glass is protected by a tarp or canvas which extends and covers the entire trailer thereby preventing damage due to flying objects or vandalism. The tarp is secured to forward and rearward trapezoidal upright members and hinged metal flaps are utilized on the forward member to minimize flapping and air gathering by the tarp which improves both the service life of the tarp and the aerodynamics of the trailer.

Thus, it is an object of the instant invention to provide a trailer for transporting planar material having a simplified material restraining apparatus.

It is a still further object of the instant invention to provide a glass transporting trailer having glass receiving means which may be readily adjusted to accept plate or single and double wall glass at least as large as twelve by twenty feet.

It is a still further object of the instant invention to provide a glass transporting apparatus which protects the glass sheets and panels against damage during transport.

Further objects and advantages of the instant invention will become apparent by reference to the following description of the preferred embodiment and appended drawings.

DESCRIPTION OF THE PREFERRED EMBODIMENT

Figure 1:
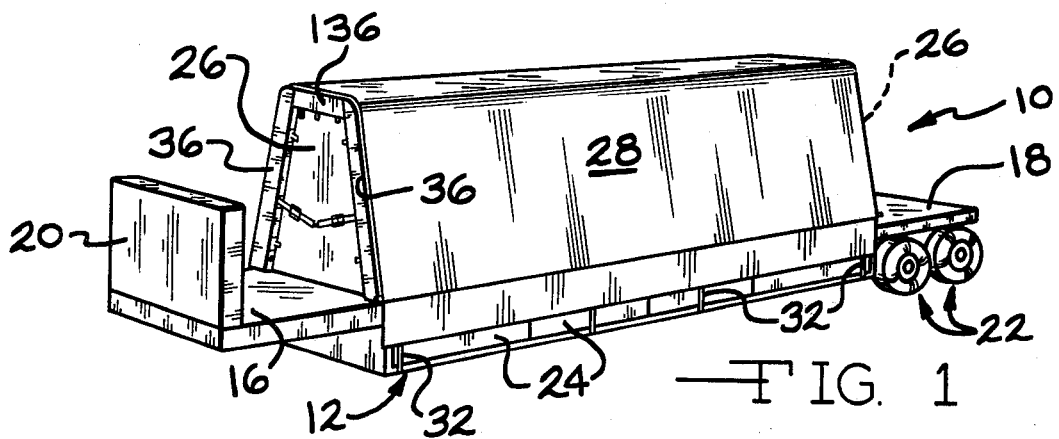
FIG. 1 is a perspective view of a glass transporting apparatus according to the instant invention.
Figure 4:
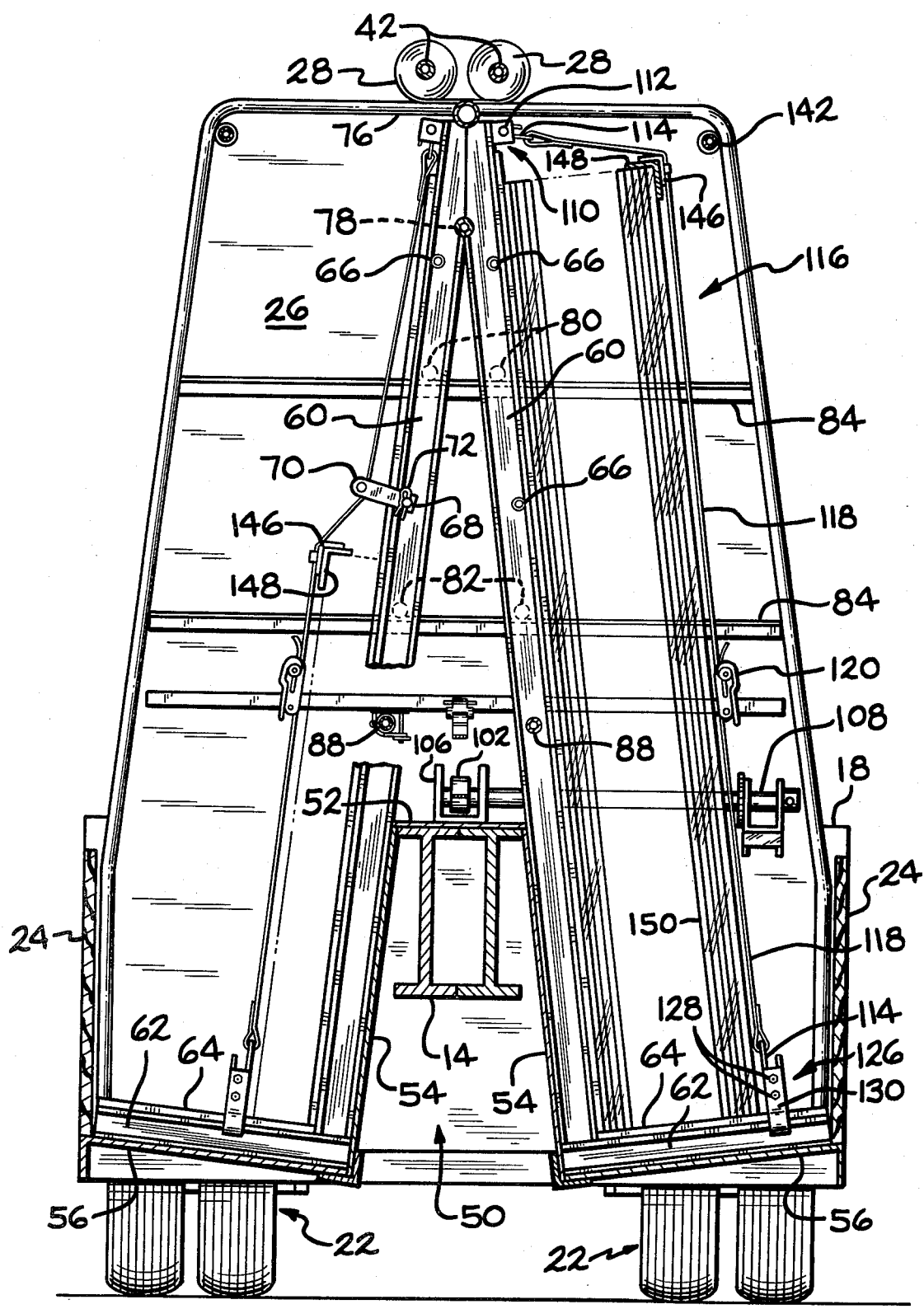
FIG. 4 is a full, sectional view of a glass transporting apparatus according to the instant invention taken along line 4—4 of FIG. 3.

Referring now to FIGS. 1 and 4, a trailer apparatus for transporting large planar objects such as sheet material and glass panels is illustrated and generally designated by the reference numeral 10. The trailer apparatus 10 includes a centrally disposed material receiving assembly 12 which is generally symmetrically disposed upon an elongate double I-beam 14 (illustrated in FIG. 4) which extends longitudinally substantially the full length of the trailer apparatus 10. The trailer apparatus 10 also includes a forward deck 16 and a rear deck 18 which are secured to and supported by the double I-beam 14. The decks 16 and 18 provide surfaces upon which cargo may be secured and transported and further provide convenient stations from which workers may assist the loading and removal of cargo from the trailer apparatus 10 as will be subsequently described. A bulkhead 20 is preferably positioned at the forward portion of the forward deck 16. Secured to the underside of the forward deck 16 is a fifth wheel (not illustrated) which selectively connects the trailer apparatus 10 to a tractor (not illustrated) in a conventional manner. Axle and wheel assemblies 22 are secured to the double I-beam 14 in the region generally below the rear deck 18. It should be understood that additional single or dual axle and wheel assemblies 22 may be utilized with the trailer apparatus 10 in accordance with its proposed maximum load and further in order to comply with various statutory axle load limits. A plurality of removable side guard panels 24 are preferably disposed along the lower right and left sides of the material receiving assembly 12. Such guard panels may be fabricated of wood, fiberglass or similar material and may be removably attached by utilization of complementary vertical shafts or beams and sockets (not illustrated).

Figure 2:
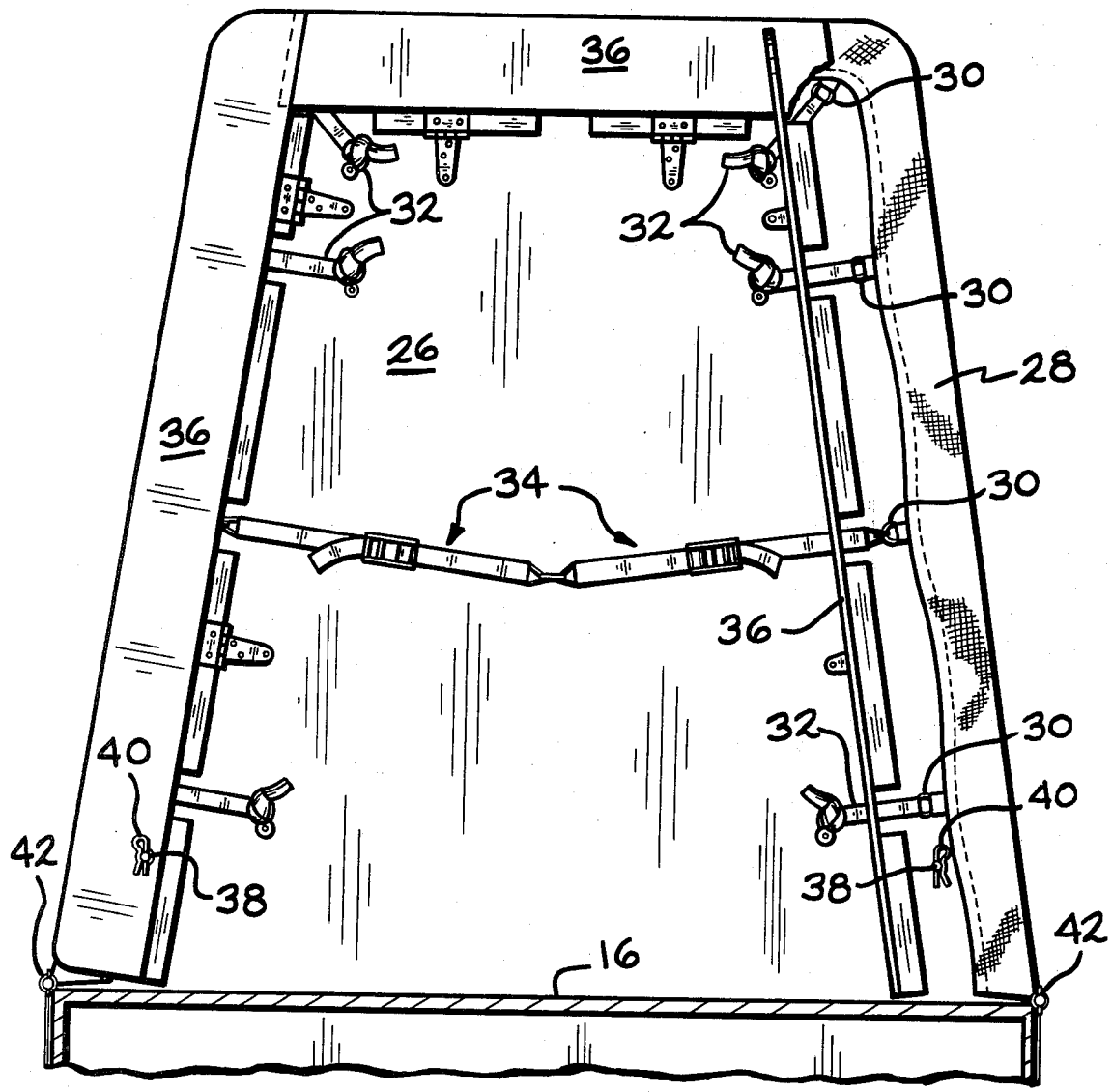
FIG. 2 is a fragmentary, elevational view of a glass transporting apparatus according to the instant invention.

Referring now to FIGS. 1 and 2, the trailer apparatus 10 also includes a pair of spaced-apart generally trapezoidal vertical panels which generally define front and rear frames 26 between which a protective canvas or tarp 28 extends. The tarp 28 provides protection for the cargo positioned within the trailer apparatus 10 from vandalism, flying objects thrown up by other vehicles and miscellaneous hazards which might damage or harm the cargo. The tarp 28 is somewhat longer than the longitudinal spacing between the frames 26 in order that it may be extended around the edges thereof and includes a plurality of eyelets 30 which may be engaged by a plurality of straps 32 which are attached to the frames 26 by suitable means in order to secure the tarp 28 thereto. Inasmuch as it is envisioned that the straps 32 may merely be hand tightened and knotted, it has been found preferable to include a pair of straps and ratchet clasp assemblies 34 on both the front and rear frames 26. The straps and ratchet clasp assemblies 34 are preferably disposed at approximately the vertical midpoint of the frames 26 and facilitate rapid and tight securement of the tarp 28 as may be readily understood by those familiar with such devices. A plurality, preferably three, hinged panels 36 are secured to the forward surface of the front frame 26. The top and leftmost panel 36 illustrated in FIG. 2 are shown in a closed position whereas the rightmost panel 36 has been pivoted into and is illustrated in an open position. In the closed position, the panels 36 protect the leading edges of the tarp 28, minimize gathering of air and reduce billowing of the tarp 28. The panels 36 may be restrained in their closed position by a suitable selectively securable fastener such as a stud 38 extending from the panel or frame 26 and a cooperating, self-retaining cotter pin 40. In the open position, the panels 36 permit ready access to the eyelets 30 and the straps 32. Inasmuch as the primary purpose of the panels 36 is to minimize the collection of air under the tarp 28, the benefits gained by utilizing a similar plurality of the panels 36 on the rear frame 26 are negligible. Their inclusion at this location may therefore be considered optional. The straps 32 are likewise utilized along the lower marginal edge of the tarp 28 to secure it to the material receiving assembly 12.

Referring now to FIGS. 2 and 4, the left and right sides of the tarp 28 are secured, at a location somewhat above the lower extremity, to a longitudinally extending rod or pipe 42. The rods or pipes 42 preferably include fittings 44 at each end which are adapted to receive a hand crank (not illustrated). By connecting the hand crank to the pipes 42, the left and/or right sides of the tarp 28 may be rolled up into the position illustrated in FIG. 4 to expose the cargo disposed within the material receiving assembly 12 and facilitate its removal from or placement therein.

Figure 3:
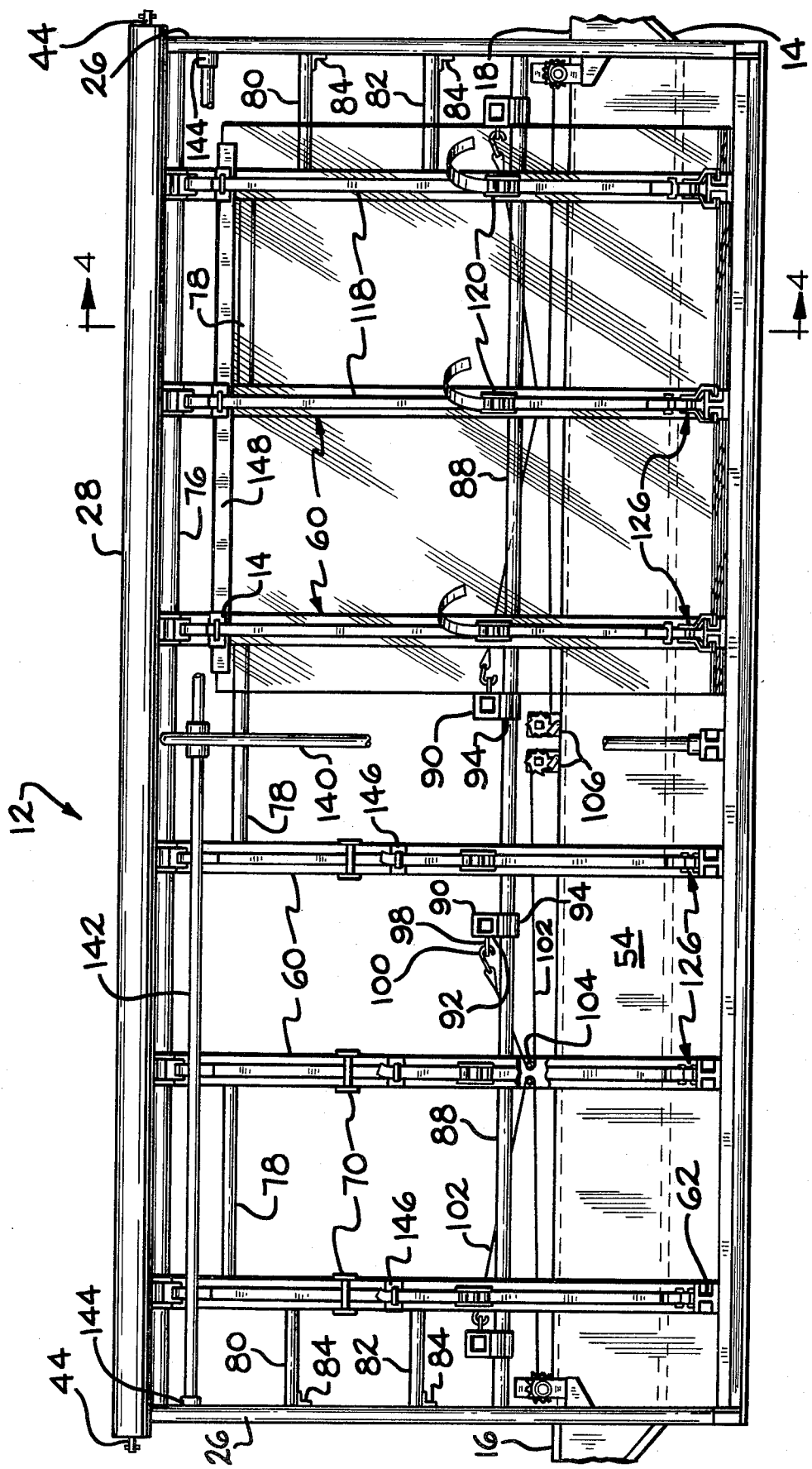
FIG. 3 is a fragmentary, side elevational view of a glass transporting apparatus according to the instant invention.

Referring now to FIGS. 3 and 4, the material receiving assembly 12 includes a symmetrical saddle-like apron assembly 50 which includes a top panel 52, a pair of inclined side panels 54 and a pair of bottom panels 56 inclined at right angles to the respective side panels 54. The panels 52, 54 and 56 of the apron assembly 50 may be welded together and extend the full length of the material receiving assembly 12 and not only provide support for the other components thereof, but form a rigid, continuous bottom which protects the cargo from contamination by chemicals often used on highways and damage resulting from objects thrown by the wheels of this or other vehicles. The apron assembly 50 supports a plurality of A-frame members 60 disposed in spaced-apart relationship along the length of the material receiving assembly 12. Preferably, the A-frame members 60 are fabricated of steel I-beams which are welded together at their apex and secured by welding or other suitable fastener means to the adjacent, parallel side panels 54 of the apron assembly 50. At the lower extremity of each of the legs of each of the A-frame members 60 is disposed on outwardly directed support beam 62. The support beams 62 are generally adjacent and parallel to the lower panels 56 of the apron assembly 50 and thus are likewise disposed at substantially a right angle to the respective legs of the A-frame members 60. The support beams 62 are preferably also fabricated of steel I-beams and include stiffly resilient padding 64 secured to and substantially covering the upper surfaces thereof. Each of the legs of each of the A-frame members 60 includes at least two bushings 66 through which a retaining pin 68 may be positioned to retain a clevis 70 at one of at least two vertical locations on the A-frame members 60. The retaining pin 68 and clevis 70 may be retained in a particular bushing 66 by means of a suitable selectively removable fastener such as a self-retaining cotter pin 72. The function of the clevis 70 will be described subsequently.

Rigidity of the material receiving assembly 12 and particularly the A-frame members 60 is enhanced by the inclusion of a rod, beam or cylindrical member 76 which is disposed at the apices of the A-frame members 60 and extends the full length of the assembly 12. The cylindrical member 76 may be secured to the A-frame member 60 by suitable weldments. Additional longitudinal support members 78 are preferably disposed between pairs of adjacent A-frame members 60 as illustrated. The support members 78 may be any suitable structural shape such as rods, tubes or beams and are preferably secured by welding. The foremost and rearmost of the A-frame members 60 are each preferably braced by a pair of upper support members 80 and a similar pair of lower support members 82. Again, the support members 80 are preferably secured by welding between the A-frame members 60 and right angle supports 84 which extend across and are secured to the frames 26.

Figure 5:
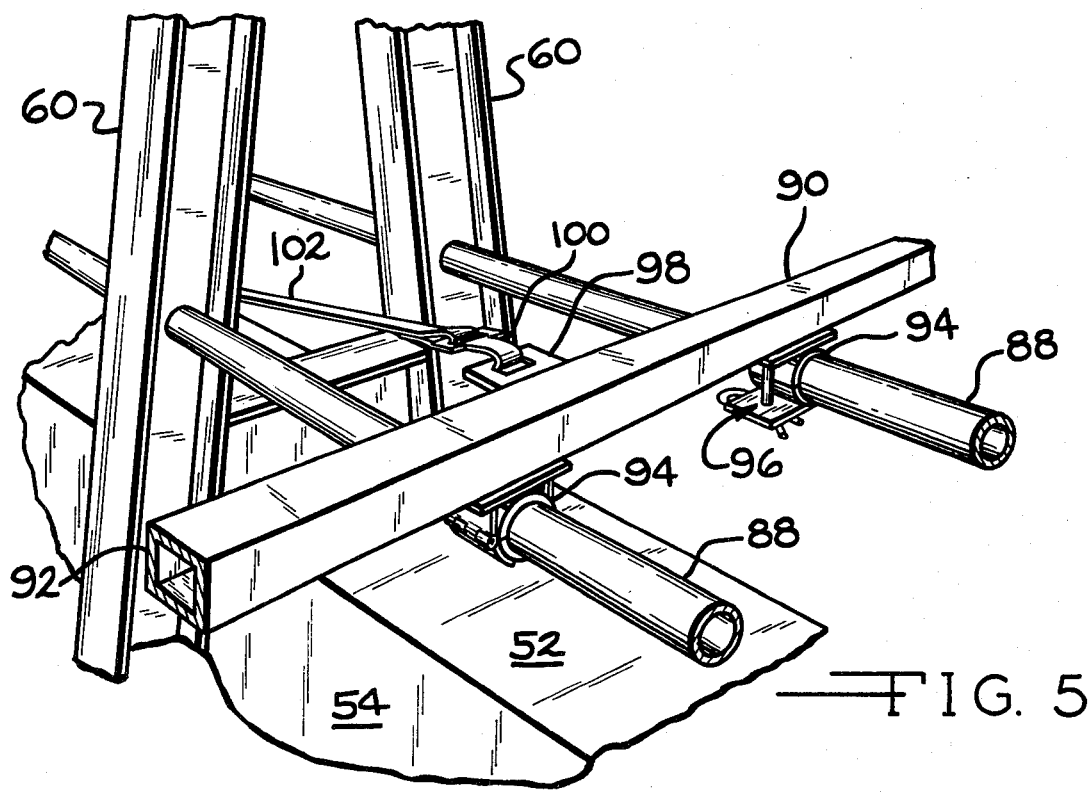
FIG. 5 is an enlarged, fragmentary perspective view of a transverse restraining beam slidably mounted on longitudinal rails.

Referring now to FIGS. 3, 4 and 5, in each leg of the A-frame members 60 at a height somewhat below the vertical midpoint thereof is disposed one of a pair of longitudinal rails 88. The pair of longitudinal rails 88 preferably extend the full length of the assembly 12 and are secured to the A-frame members 60 by welding. Slidably and removably disposed upon the pair of longitudinal rails 88 are a plurality of transversely extending restraining beams 90. The restraining beams 90 are preferably structural shapes which have at least one flat, vertically extending side surface 92 such as box girders. Each of the restraining beams 90 includes a hinged, split bushing 94 such as that illustrated in my previously referenced U.S. Pat. No. 4,195,738 which opens to permit removal of the restraining beam 90 from the longitudinal rails 88. A closure assembly 96 such as a fixed pin having an aperture for receiving a self-retaining cotter pin may be used to secure the bushings 94 about the rails 88 and thus slidingly mount the restraining beams 90 thereon. Each of the restraining beams 90 also includes a means such as an eyelet 98 for receiving a hook 100 or other complementary member attached to a cable or strap 102 for effecting connection therebetween. The cables or straps 102 are reaved about shafts or cylindrical members 104 which are transversely secured between adjacent legs of the A-frame members 60 adjacent the foremost and rearmost A-frame members 60. The cables or straps 102 are secured at their opposite ends to hand winches or other payout devices 106. The winches 106 disposed adjacent the front and rear panels 26 preferably each include an extension shaft 108 (illustrated in FIG. 4) which facilitates access thereto and operation thereof. It should be apparent from reference to FIG. 3 that the material receiving assembly 12 preferably includes four of the transverse restraining beams 92 and four sets of the associated components just described. The utilization of these components will be described subsequently.

Figure 6:
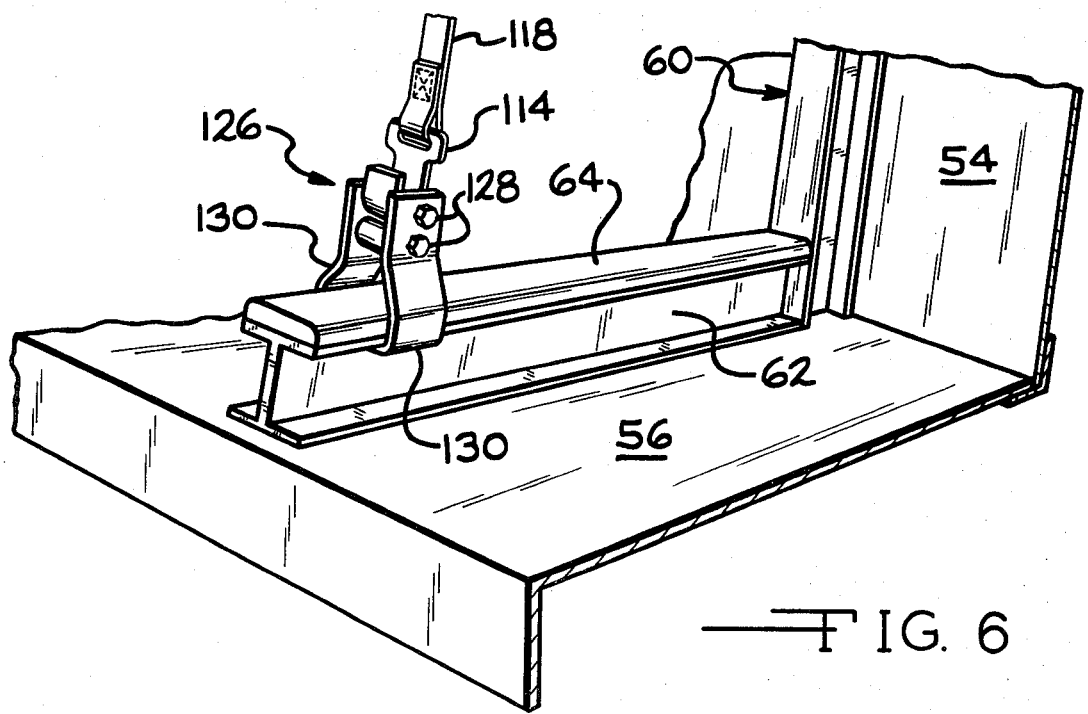
FIG. 6 is an enlarged, fragmentary perspective view of the cargo strap securement device on the lower portion thereof.

Referring now to FIGS. 4 and 6, on each side of the apices of the A-frame members 60 is disposed a clevis-like device 110 which includes a longitudinally disposed pin 112. The longitudinally disposed pins 112 receive and selectively secure complementary hooks 114. The hooks 114 terminate a plurality of ratchet clasp cargo strap assemblies 116. The cargo strap assemblies 116 each include conventional cargo straps 118 and ratchet buckles or clasps 120 such as manufactured by the Aeroquip Corporation of Jackson, Michigan. The lower terminus of each of the cargo straps 118 is likewise terminated in a hook 114 which is selectively securable in a specially configured horseshoe hook 126. The horseshoe hook 126 includes a pair of parallel bolts or pins 128, one of which is engaged by the hook 114 and to which a pair of symmetrical J-shaped members 130, which resemble mirror-image questionmarks, are secured. Each of the J-shaped members 130 engages a respective side of one of the outwardly extending I-beam support members 62. The utilization of the ratchet clasp and cargo strap assemblies 116 as lateral restraints for the cargo positioned within the material receiving assembly 12 will be described momentarily.

Prior to such operational description, two final structural details of the material receiving assembly 12 will be described. With reference to FIG. 3 first of all, it may be appreciated that the tarp 28, extending as it does from the frames 26 disposed at opposite ends of the material receiving assembly 12 is somewhat subject to sagging. It has therefore been found preferable to include a centrally disposed frame 140 having a profile when viewed transversely which substantially duplicates the outer profile of the frames 26. The frame 140 is preferably fabricated of a structural member such as a tube. The frame 140 is stabilized by a pair of longitudinally extending braces 142 which are removably received in sockets 144 disposed on the inner faces of the frames 26. The frame 140 and the braces 142 thus provide support for the tarp 28 in the middle and along the upper, outer edges of the material receiving assembly 12. The braces 142 may, however, be readily removed to assist the loading and unloading of cargo. In order to ensure tight securement of the cargo within the assembly 12, it has been found preferable to utilize L-shaped brackets 146 which are slidably disposed on each of the cargo straps 118 as illustrated in FIGS. 3 and 4. The L-shaped brackets 146 engage elongate padded right angle guards 148 which are disposed between them and the upper, outer corners of a cargo 150. A plurality of the elongate guards 148 may be prepared in various lengths and utilized as appropriate with various lengths of the cargo 150.

The utilization of the trailer apparatus 10 will be described with reference to FIGS. 2 through 6. For purposes of this explanation, it will be assumed that the trailer apparatus 10 is empty and that it is to be loaded. Unloading operations of the trailer 10, which will not be described, may be achieved by simply following the subsequently delineated steps in the reverse order.

As illustrated in FIG. 4, the tarp 28 is rolled up, on the top of the front and rear frames 26. Preparatory to loading the cargo 150, the transverse restraining arms 90 are moved to spaced-apart positions sufficient to receive the cargo 150 by releasing the winches 106 and manually sliding the restraining beams 90. Should the cargo 150 be so wide so as to necessitate passage of one of the restraining beams 90 beyond an interfering A-frame member 60, the closure assembly 96 of each of the hinged, split bushings 94 of a given restraining beam 90 may be opened, the hook 100 removed from the eyelet 98, the restraining beam 90 lifted from the longitudinal rails 88 and replaced and resecured to the rails 88 on the opposite side of the interfering A-frame member 60. The hooks 114 on either or both ends of the ratchet clasp and cargo strap assemblies 116 are then disconnected from the associated member. The cargo 150 may then be placed into the material receiving assembly 12 where it is supported on the resilient padding 64 of the support beam 62 and rests against the outer faces of the A-frame members 60 in a substantially vertical orientation. If, as illustrated in FIG. 4, some of the cargo 150 is relatively short in height, the clevis 70 may be secured in the lower of the two bushings 66 in the A-frame member 60 to restrain the cable 118 at a site substantially below the clevis-like device 110 disposed at the apices of the A-frame members 60. The right angle guards 148 may then be placed into position on the upper, outer corners of the cargo 150 and the L-shaped brackets 146 slid into abutting contact therewith, as illustrated in FIG. 4. Next the hooks 114 are resecured to the appropriate complementary member, the horseshoe hooks 126 are positioned as illustrated and the ratchet buckles or clasps 120 are utilized to tighten the cargo straps 118. Similarly, the transverse restraining beams 90 are slid longitudinally along the rails 88 by the winches 106 such that the vertically extending side surfaces 92 thereof contact the edges of the cargo 150 and securely restrain the cargo 150 against longitudinal movement within the material receiving assembly 12. The tightening of the straps 118 and movement of the restraining beams 90 may be accomplished in the reverse order if desired.

This substantially completes the loading of the cargo 150 into the material receiving assembly 12. If the braces 142 or the guard panels 24 were removed in order to facilitate loading, they may now be replaced and the tarps 28 unrolled down the inclined sides of the front and rear frames 26. The straps 32 and the strap and ratchet clasp assemblies 34 may then be utilized to secure the tarp 28 to the front and rear frames 26 and assembly 12 as illustrated in FIGS. 1 and 2. Finally, the hinged panel 36 may be pivoted into positions parallel to the front frame 26 and secured there by the self-retaining cotter pins 40. As noted above, the cargo 150 may be removed from the trailer apparatus 10 by reversing the above delineated steps.

The foregoing disclosure is the best mode devised by the inventor for practicing this invention. It is apparent, however, that devices incorporating modifications and variations will be obvious to one skilled in the art of material transportation apparatus. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

What is claimed is:

1. An apparatus for transporting planar sheets of material in a substantially vertical position comprising, in combination, a plurality of rigid A-frame members disposed in parallel, fixed, spaced-apart relationship, said A-frame members having two inclined legs and an outwardly extending support beam secured to the lower portion of each said legs of said A-frame members, moveable means for engaging said outwardly extending support beams at a selected location along their length, a cargo strap secured between the top of one of said A-frame members and a respective one of said moveable beam engaging means, means for tightening said cargo strap, a pair of longitudinal rails extending between and secured to adjacent pairs of said A-frame members, at least one longitudinally translatable transverse beam, means for removably securing said transverse beam on said pair of longitudinal rails, and means for moving said transverse beams longitudinally along said rails for securing said planar sheets of material.

2. The planar sheet transporting apparatus of claim 1 wherein said support beam includes a surface oriented substantially normal to a respective one of said inclined legs and said moveable beam engaging means engages said surface and is moveable along said surface.

3. The planar sheet transporting apparatus of claim 1, wherein said support beam includes a vertically oriented web secured at substantially the midpoint of a horizontally extending plate and said moveable beam engaging means includes a pair of symmetrically arranged fingers which engage said plate on opposed sides of said web.

4. The planar sheet transporting apparatus of claim 1, wherein said transverse beam includes a substantially planar vertically oriented face for engaging such planar sheets of material and said means for moving said transverse beams includes a winch and a strap operably interconnecting said winch and said beam.

5. The planar sheet transporting apparatus of claim 1, further including at least one elongate right angular guard means for placement on the upper, horizontal edge of such planar material most distant said A-frame members and means for engaging said guard means slidably disposed on said cargo strap.

6. The planar sheet transporting apparatus of claim 1, wherein said securing means includes a bushing comprising first and second halves, hinge means for interconnecting said halves and for permitting movement of said halves between a first, rail receiving position and a second, rail engaging position, and means for selectively retaining said first and said second halves in said second position.

7. The planar sheet transporting apparatus of claim 1, further including means for transversely restraining said cargo strap at a location below said top of said A-frame member.

8. An apparatus for transporting planar sheets of material in a substantially vertical orientation comprising, in combination, a plurality of rigid A-frame members disposed in parallel, fixed, spaced-apart relationship, said A-frame members having two inclined legs and an outwardly extending support beam secured to the lower portion of each said legs of said A-frame members, moveable means for engaging said outwardly extending support beams at a selected location along their length, at least one cargo strap secured between a first location at the top of one of said A-frame members and a first location on a respective one of said moveable beam engaging means, a second location on means for transversely restraining said cargo strap at a third location on said one of said A-frame members between said first and said second locations, means for tightening said cargo strap, a pair of longitudinal rails extending between and secured to adjacent pairs of said A-frame members, at least a pair of longitudinally translatable transverse beams, means for removably securing said transverse beams on said pair of longitudinal rails and means for moving said transverse beams longitudinally along said rails for securing said planar sheets of material.

9. The planar sheet transporting apparatus of claim 8, wherein said support beam includes a vertically oriented web secured at substantially the midpoint of a horizontally extending plate and said moveable beam engaging means includes a pair of symmetrically arranged fingers which engage said plate on opposed sides of said web.

10. The planar sheet transporting apparatus of claim 8, wherein said securing means includes a bushing comprising first and second halves, hinge means for interconnecting said halves and for permitting movement of said halves between a first, rail receiving position and a second, rail engaging position, and means for selectively retaining said first and said second halves in said second position.

11. The planar sheet transporting apparatus of claim 8, further including at least one elongate right angular guard means for placement on the upper, horizontal edge of such planar material most distant said A-frame members and means for engaging said guard means slidably disposed on said cargo strap.

* * * * *